United States Patent

[11] 3,612,808

[72] Inventors Jerome W. Nelson;
 Travis Howell, Jr., both of Houston, Tex.
[21] Appl. No. 830,479
[22] Filed June 4, 1969
[45] Patented Oct. 12, 1971
[73] Assignee CRC-Crose International, Inc.
 Houston, Tex.

[54] SHIELDING GAS PRESSURE ACTUATED PIPE-WELDING DEVICE
 13 Claims, 8 Drawing Figs.
[52] U.S. Cl.................................................. 219/60 A,
  200/82, 219/125, 219/161
[51] Int. Cl...................................................... B23k 9/02
[50] Field of Search........................................... 219/59, 60,
  64, 67, 101, 124, 125, 161; 228/44; 200/82

[56] References Cited
UNITED STATES PATENTS
1,846,470  2/1931  Burnish...................  219/60

| 2,305,591 | 12/1942 | Sonneborn | 200/82 X |
| 3,009,048 | 11/1961 | Stanley | 219/60 |
| 3,084,246 | 4/1963 | Rieppel | 219/125 |
| 3,126,471 | 3/1964 | Nelson | 219/60 |
| 3,207,408 | 9/1965 | Thome et al. | 219/125 X |
| 3,461,264 | 8/1969 | Nelson et al. | 219/60 |

Primary Examiner—J. V. Truhe
Assistant Examiner—L. A. Schutzman
Attorney—Edwin M. Thomas ABSTRACT: An internal pipe-welding device having a carriage, an internal pipe clamp, a rotating welding nozzle which is pivotally mounted and biased away from its welding position, a pressure responsive means connected to the welding nozzle and adapted to move the welding nozzle to welding position responsive to the supply of shielding gas through a single service lead supplying the welding potential, the motive power for feeding electrode and the shielding gas. The pivoting of the welding nozzle also pivots a contact button which makes contact to supply electricity for welding to the welding nozzle only when the nozzle is in welding position.

PATENTED OCT 12 1971 3,612,808
SHEET 1 OF 4
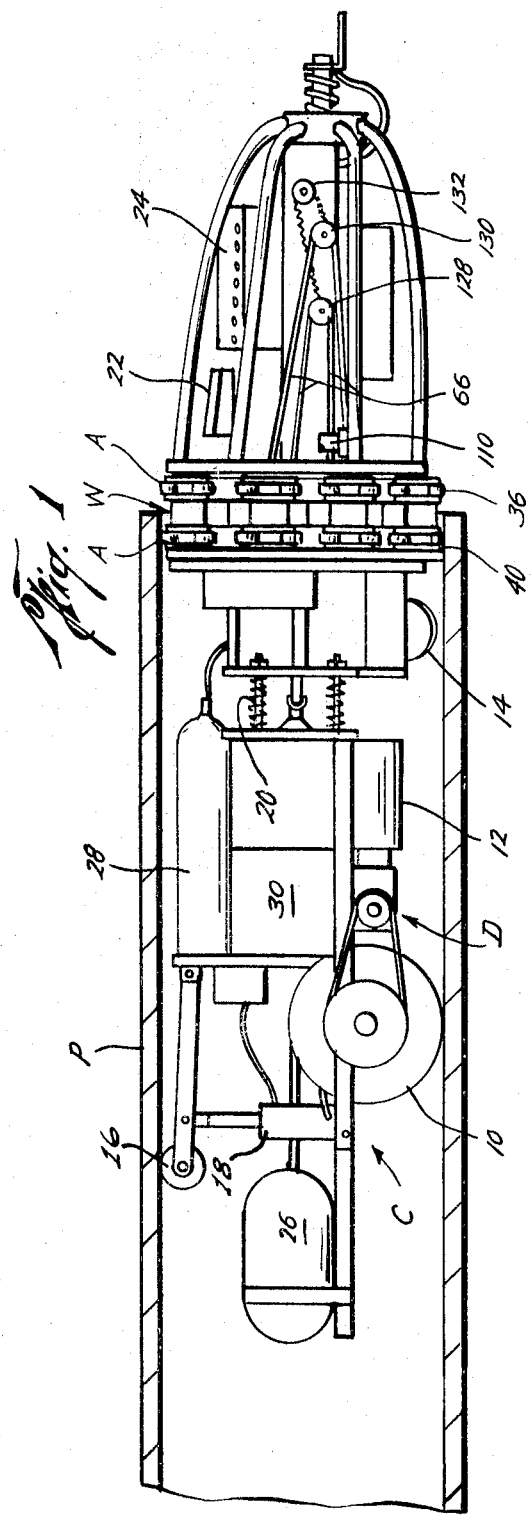
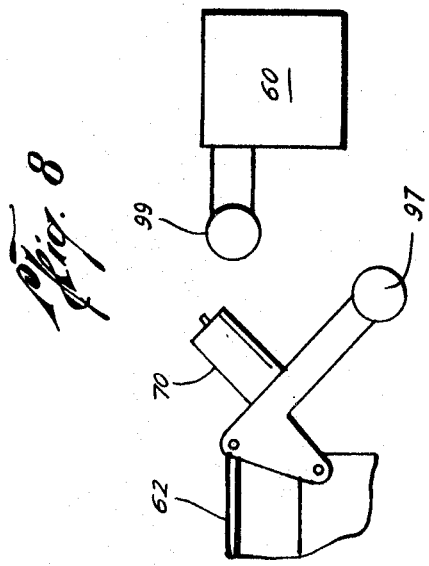
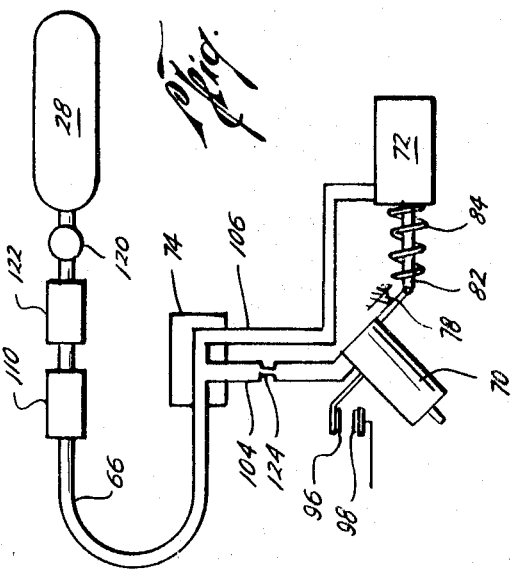
INVENTORS
Jerome W. Nelson
Travis Howell, Jr.
BY Edwin M. Thomas
ATTY.

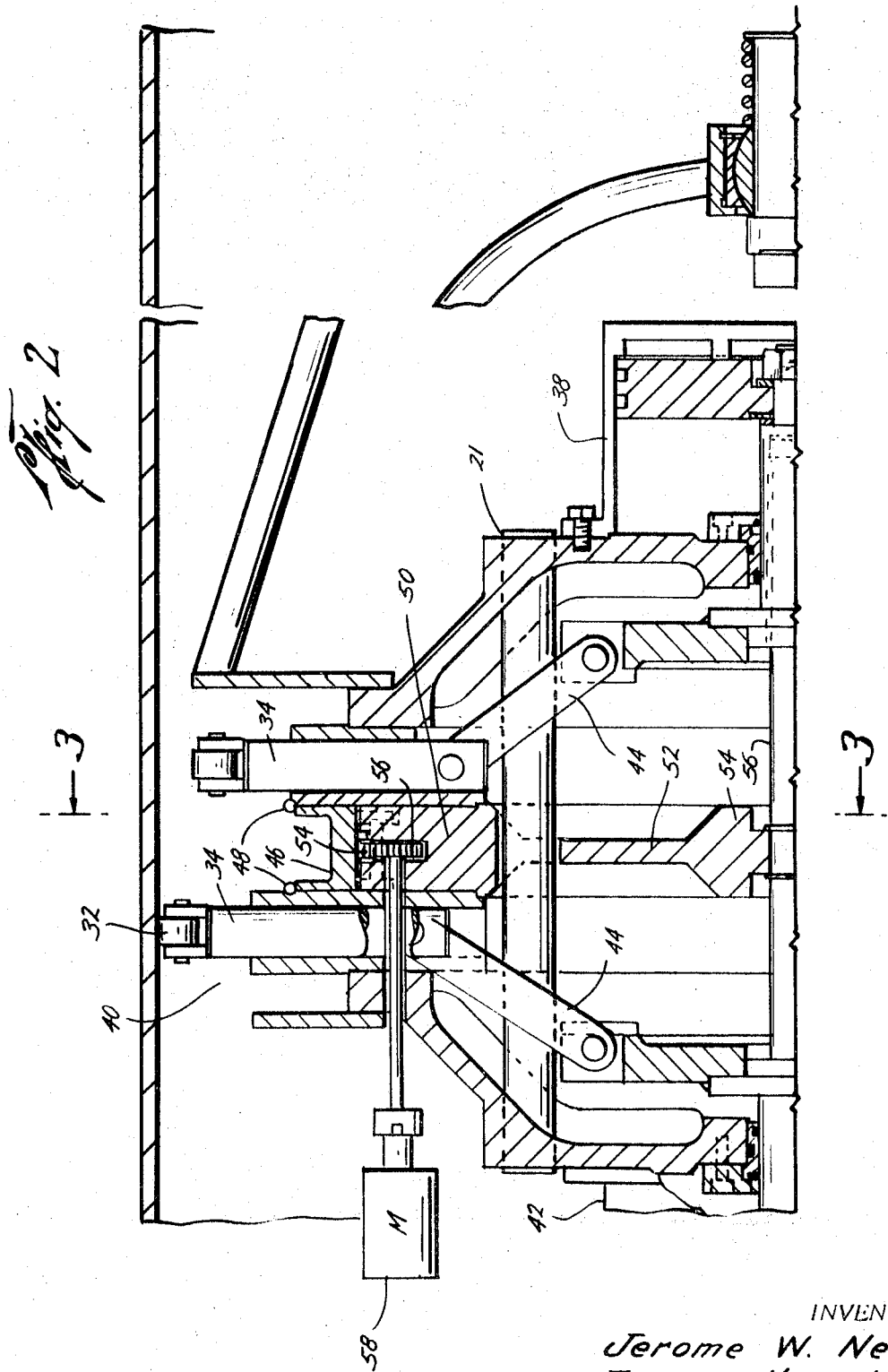

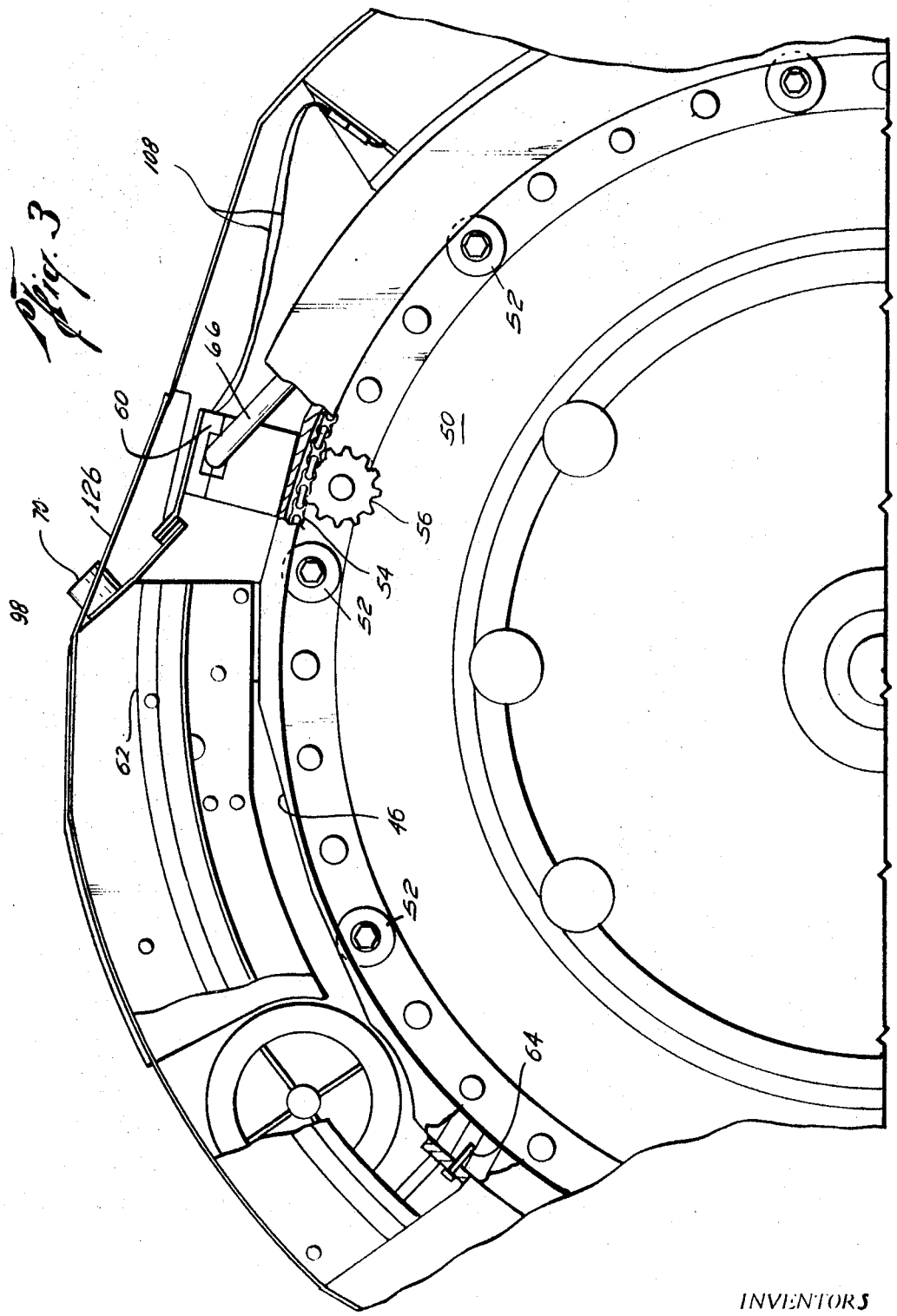

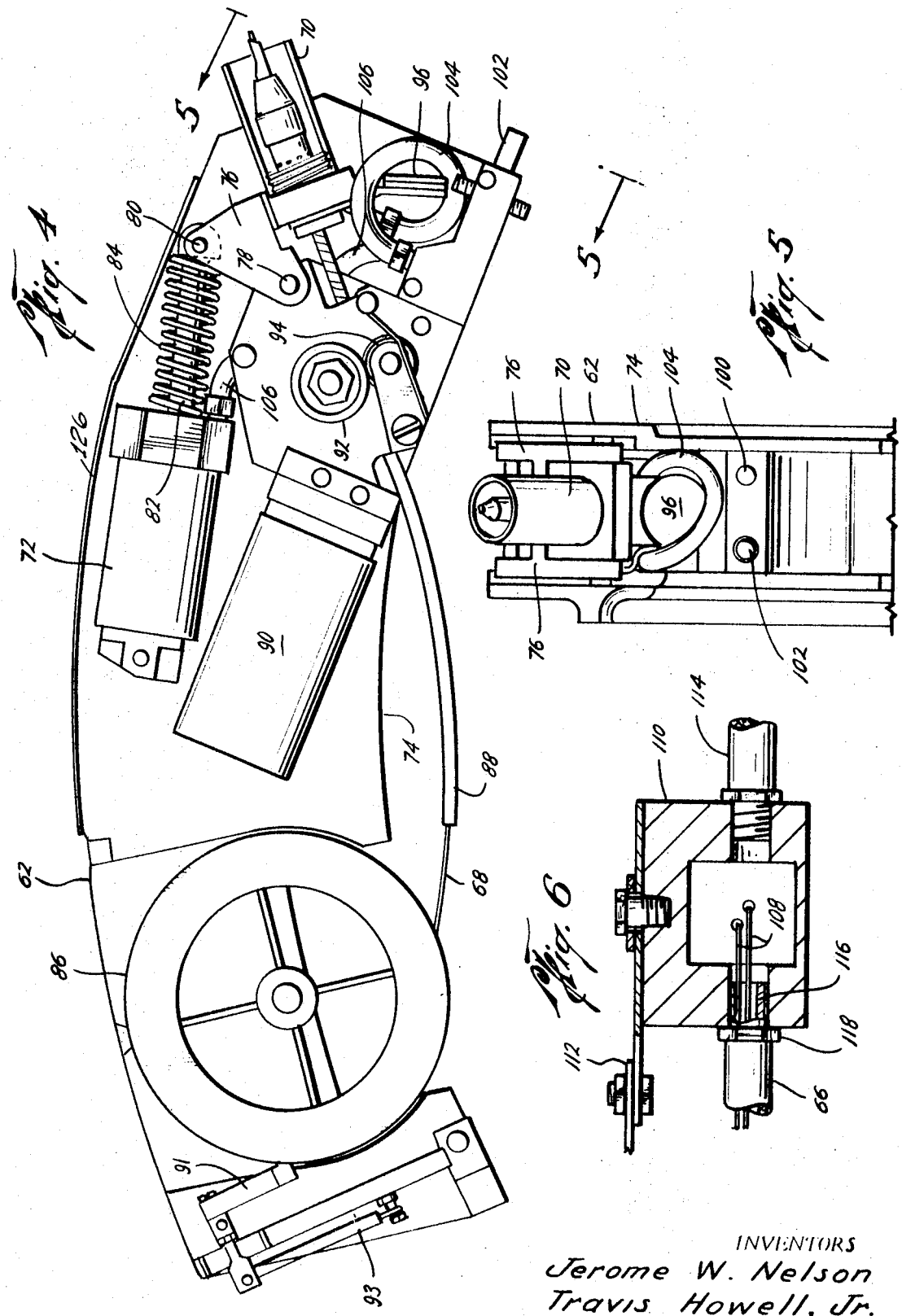

3,612,808

SHIELDING GAS PRESSURE ACTUATED PIPE-WELDING DEVICE

SUMMARY

The present invention relates to an internal pipe-welding device and is an improvement on the device disclosed in the pending application of Jerome W. Nelson, Ser. No. 608,872, filed Jan. 12, 1967 now U.S. Pat. No. 3,461,264.

An object of the present invention is to provide an improved internal pipe-welding device which automatically welds the interior of pipe joints with a minimum of movement of the welding assemblies.

Another object is to provide an improved internal pipe-welding device having easily removable cartridges containing the welding nozzles, electrode supply and electrode feeding means so that a defective nozzle or feeding means may be readily replaced and a new supply of electrode provided quickly and simply.

A further object is to provide an improved internal pipe-welding device which avoids fatigue problems resulting from continual flexing of the electrical connector supplying the welding potential.

Still another object of the present invention is to provide an improved internal pipe-welding device in which the gas shielding of the welding arc is assured.

A still further object of the present invention is to utilize the pressure of the shielding gas to move the welding nozzle to its welding position by maintaining pressure on the shielding gas until it is delivered to the welding nozzle.

Still another object is to provide an improved internal pipe welding device in which the pressure of shielding gas maintains the connection of the welding current to the welding nozzle.

BRIEF DESCRIPTION OF THE DRAWINGS

These and other objects and advantages of the present invention are hereinafter disclosed and explained with reference to the structure shown in the drawings wherein:

FIG. 1 is an elevation view of the device of the present invention positioned within the end of one pipe with a portion of the pipe broken away to show the device.

FIG. 2 is a detail partial sectional view taken through the welding and clamping assemblies with the welding cartridge removed to illustrate the structure for rotating the welding assembly.

FIG. 3 is a sectional view of the welding assembly illustrating the chain drive of the rotating ring, the service block and the removable welding cartridge in position secured to the rotating ring.

FIG. 4 is an elevation view of a cartridge with its side cover removed.

FIG. 5 is an end view of the welding cartridge to better illustrate the mounting of the welding nozzle and the means for connecting to the service block.

FIG. 6 is a sectional view of the manifold block which is used to connect the welding cable, motor drive leads and the gas to the flexible service lead.

FIG. 7 is a schematic view of the shielding gas system illustrating its relationship to the welding nozzle and the pressure responsive means which controls the position of the welding nozzle.

FIG. 8 is an elevation view of a modified form of button contact to connect the welding current from the service block to the welding nozzle.

DESCRIPTION OF THE PREFERRED EMBODIMENTS

The improved internal pipe-welding device of the present invention is shown in FIG. 1 positioned partly within the pipe P with the welding nozzles of the device located in reference to the end of pipe P in their desired position for welding. The welding device includes a carriage C, drive means D for moving the carriage within a pipe, a pair of clamping assemblies A with a welding assembly W therebetween and means for supplying electricity for welding, power for rotating the welding assembly W, power for drive means D and shielding gas. The drive means D includes the drive wheel 10 which is driven by the motor 12, the front wheels 14 and the balancing wheel 16 which is moved into engagement with the top interior of the pipe P by the actuator 18. A flexible mounting 20 is provided between the clamping assembly and the rear portion of the carriage C so that when the clamping assemblies A are actuated into position against the interior of the pipe, they do not have to overcome a misalignment of the carriage by moving the rear portion of the carriage C. The front portion of the carriage C carries the alignment blocks 22 which are pneumatically actuated to move into engagement with the end of the pipe P to properly position the device the proper distance into pipe P. The front end of the carriage C provides a support for connection of controls and electricity for welding to the device. Additionally, the control panel 24 is supported on the front portion of the carriage C to allow operation of components of the device before the next pipe section is moved into position abutting the exposed end of pipe P.

The tank 26, supported on the rear portion carriage C, supplies compressed air or other suitable gas for actuation of the clamping assemblies A and such other actuators such as the alignment blocks actuators and the actuator 18 for the wheel 16. The tank 28 is also supported on the rear portion of the carriage C above the batteries 30, and contains a supply of high pressure shielding gas for the arc of the welding nozzle.

The clamping assemblies as shown in FIG. 2 include a plurality of rollers 32 mounted on the pins 34 which are slidably mounted in the clamping assemblies. The front clamping assembly 36 is actuated by the front cylinder 38 and the rear clamping assembly 40 is actuated by the rear cylinder 42. Actuation of the respective cylinders 38 and 42 causes the linkages 44 to move the pins 34 radially outward into clamping engagement with the interior of the pipes in which the assemblies are positioned.

The rotating ring 46 comprises an annular member which is channel shaped in cross section and is positioned between the front and rear clamping assemblies and suitable seals 48 are provided to prevent the entry of dust between ring 46 and the clamping assemblies. The seals 48 may be nylon tubes each having a spring extending therethrough to hold the tubes in place between the outer edge of ring 46 and the structure of the clamping assemblies. The ring 50 is positioned between the clamping assemblies inside the ring 46 to retain the clamping assemblies a preselected distance apart. The ring 50 includes the spider 52 with the central hub 54 through which the shaft 56 extends to guide the actuation of the cylinders 38 and 42.

The welding assembly W is secured to the ring 46 so that as the ring is rotated, the welding assembly welds along the interior of the abutting ends of the two sections of pipe. As shown in FIG. 3, the ring 46 is supported from the ring 50 by the rollers 52. The chain 54 is secured around the inner periphery of ring 46 and is engaged by the gear 56 which is driven by the motor 58 to rotate the ring 46.

The welding assembly W includes the service block 60 which is secured to the ring 46 by suitable fastening means and the cartridge 62 which engages with the block 60 and is secured to the ring 46 by the single screw 64 and by its engagement with the block 60. The service block 60 is connected to the flexible service lead 66 to provide a supply of electricity for welding, electricity for feeding the welding electrode 68 through the welding nozzle 70, and shielding gas to shield the welding arc and to actuate the pressure-responsive means or actuator 72 to move the welding nozzle 70 which is pivotally mounted in cartridge body 74. The welding nozzle 70 is secured to the arms 76 which are mounted by the pin 78 to the body 74 and are also secured by the pin 80 to the arm 82 of the pressure-responsive actuator 72. The spring 84 surrounds the arm 82 and urges the welding nozzle 70 away from its welding position. Thus, it is necessary to deliver gas to the actuator 72 to move the nozzle 70 to its welding position and when gas is so delivered, there is a supply of gas for shielding the arc of the welding.

The cartridge body 74 provides a recess for the rotational mounting of the electrode reel 86. The electrode 68 is fed from the reel 86 through the tube 88 and the feeding means to the nozzle 70. The feeding means includes the motor 90 which drives a wheel 92 and the bearing 94 which is resiliently held against the wheel 92 with the electrode therebetween so that as the wheel 92 is rotated, the electrode is moved into the nozzle 70.

The arm 91 extends through the end wall of cartridge body 74 and is pivoted therein. The end of arm 91 extending on the outside of the end wall is connected to the spring 93 to bias the arm 91 against the rim of the reel 86 to act as a brake to resist uncontrolled turning of the reel 86.

The contact button 96 is secured to and electrically connected to the nozzle 70 and extends outwardly therefrom so that as the nozzle 70 is pivoted about the pin 78 by the actuator 72 it comes into direct contact with the contact button 98 which extends from service block 60. The electricity for welding is conducted through the service lead 66 and the button 98 to the button 96 and welding nozzle 70.

The modified form of the mounting of the contact buttons on the service block 60 and the cartridge 62 is shown in FIG. 8. In this form of the device, the contact buttons 97 and 99 are turned to positions at 90° from the positions of the contact buttons 96 and 98. With the buttons rotated to this position they wipe against each other with each movement of the welding nozzle 70. This wiping action clears corrosion and dirt from the surface of the buttons which might interfere with the efficient transmission of the electricity for welding between the buttons. In this modified form, it is preferred that a stop be provided to stop the nozzle at its desired welding position.

The shielding gas, as hereinafter explained with reference to the schematic drawing of FIG. 7, is conducted to the service block 60 by the service lead 66. The service block 60 defines two recesses, one of which communicates with the gas from the service lead 66 and the other being blind to function as an alignment recess. Alignment pin 100 and connector 102 FIG. 5 extend from the end of cartridge body 74 and are adapted to engage with the two recesses in service block 60. The cartridge body 74 defines passages (not shown) providing communication to the nozzle 70 and to the actuator 72 through the tubes 104 and 106 respectively.

The leads 108 FIG. 6 which extend through the interior of service lead 66 connect to the electrode feed motor 90 to control the rate of feeding of the electrode to the nozzle 70. The manifold block 110 shown in FIG. 6 is connected to the welding current bar 112, to the feeding motor leads 108 and to the gas line 114 and connects to the service lead 66. The service lead 66 is a braided reinforced plastic tube such as that sold by the U.S. Stoneware Corporation, Inc. under the trademark TYGON. The leads for conducting the welding current through the service lead 66 are bare wires 116, the ends of which are secured together as by soldering in the end fitting 118 of the service lead 66 so that an electrical connection is completed from the current bar 112 through the manifold block 110 to the fitting 118 and thereby allow welding current to be conducted through the wires 116 to the service block 60 and the contact button 98.

The gas system as shown in FIG. 7 extends from the tank 28 through suitable tubing, the pressure regulator 120, the dividing manifold 122, the manifold block 110, the flexible lead 66, to the cartridge body 74. A portion of the gas system extends through the tube 121 through the control portion of the clamping assemblies. The orifice 124 is positioned in the gas system immediately ahead of the connection to the nozzle 70 so that the full gas pressure provided by the regulator 120 is maintained throughout the system to the actuator 72 and through the service lead 66. The pressure of the gas flowing through the orifice 124 is reduced to atmospheric without reducing the pressure in the gas system. Other service blocks in the welding assembly are supplied with gas from the dividing manifold 122. The gas flowing through the orifice 124 is conducted to flow through the nozzle 70 and surround the arc produced by the welding. The pressure in the service lead 66 also assures that the flow of gas will continue to flow therethrough as the gas pressure expands the lead and prevents it from kinking as it is flexed because of the movement of the rotating ring 46.

In order to protect the welding assembly W from damage due to spattering of the consumable electrode during welding, the cover 126 is secured completely around the outside of the welding assembly and provides space for the movement of the welding nozzles from their inactive position to their welding position. The cover 126 includes a plurality of flexible strips which are secured to the cartridge body 74, to the service block 60 and to the moving nozzle 70. The strip secured to the welding nozzle 70 is allowed to slide between the other strips and is provided with a hole through which the nozzle extends so that all of the welding assembly W is protected from the spattering of the arc except that projecting portion of the nozzle which is welding. The cover 126 is preferably made of thin beryllium copper sheeting, since the weld spatters do not stick to such material.

Only one service block 60 and one cartridge 62 has been described but in the preferred form of welding device of the present invention, four complete assemblies of service blocks and cartridges are to be used. With such structure the rotating ring 46 need only be rotated approximately 90° to make a complete weld. It is generally preferred that such welding be done on a downward pass of the welding nozzle so that as the rotating ring is being moved in one direction, two of the welding nozzles will be welding and as it returns in the opposite direction, the other two welding nozzles will be welding. Generally since the service leads 66 for the four welding assemblies must extend through the front clamping assembly 36, the limit of the rotation of the ring 46 is determined by the available movement of the service leads 66. Such service leads are held under light tension as shown in FIG. 1 by sheaves 128 over which they extend. These sheaves 128 are connected by the spring 130 which extends around the sheave 132. Thus as one of the leads 66 feeds through the assembly 36, the other lead is pulled back through by the tension of spring 130.

From the foregoing, it can be seen that the present invention provides an improved internal pipe-welding device in which the welding nozzle, welding electrode supply reel and electrode-feeding means which are all mounted in a cartridge may be easily and quickly removed simply by releasing the single screw 64 and thereafter a new or the same cartridge may be simply installed. In this device, the welding nozzle is not connected to the electricity for welding unless there is a sufficient supply of shielding gas to cause the pressure responsive means 72 to move the welding nozzle 70 to its welding position. This assures that there is always an adequate supply of shielding gas during welding. Whenever the gas pressure falls then the actuator 72 allows the welding nozzle 70 to return to its inactive position and connection of the electricity for welding is broken by the separation of the contact buttons.

Another feature provided by the welding device of the present invention is that all but the arc forming and shielding parts of the welding device are protected against being spattered by the arc consumption of the electrode. Further, even though there is sufficient movement of the welding device to make a complete weld of the abutting edges of adjacent pipe sections, the amount of fatigue failure of the electric connectors is minimized since the flexing of the electric leads is minimized.

What is claimed is:

1. A welding device for producing girth welds in pipes, comprising a movable carriage adapted to carry a welding head in an orbital path around the circumference of a pipe, a subcarrier in said carriage for the welding head, said welding head including a welding nozzle, means for pivotally mounting the welding head on said subcarrier, means for supplying a shielding gas to said head under pressure, means responsive to pressure of the shielding gas and connected to the welding head to move said welding head and nozzle pivotally from nonwelding to welding position, and means connecting shielding gas to said pressure-responsive means whereby said welding nozzle is held in welding position when said gas supplied to said pressure-responsive means.

2. An internal pipe-welding device according to claim 1, wherein
said connecting means for supplying shielding gas to said pressure-responsive means connects to the supply of shielding gas immediately ahead of said welding nozzle.

3. An internal pipe-welding device according to claim 2, including
a contact button connected to said welding nozzle,
a contact button secured to said transporting means and in electrical contact with said electric welding potential,
said welding nozzle contact button adapted to engage said other contact button being movably mounted and movable by said nozzle only when said welding nozzle is in its welding position.

4. An internal pipe-welding device according to claim 1, including
a replaceable cartridge provided with quick release means and thereby adapted to be removably secured to said transporting means,
said cartridge containing said welding nozzle, a supply of electrode and means for feeding electrode to said welding nozzle.

5. An internal pipe-welding device according to claim 1, wherein said transporting means includes
a ring mounted in said carriage for rotation,
a chain secured around at least a portion of the interior of said ring,
a motor, and
a gear connected to said motor and engaging said chain whereby as said gear rotates its engagement with said chain causes said ring to rotate.

6. An internal pipe-welding device according to claim 5, including
a service block secured to said ring for supplying gas and electricity to the welding nozzle, and
a quick release cartridge supporting said welding nozzle and adapted when attached to engage said service block and including means for securing said cartridge to said ring.

7. An internal pipe-welding device according to claim 6, wherein
said cartridge is secured to said ring in part by its engagement with said service block and in part by a single fastener whereby it is easily and quickly installed and removed.

8. An internal pipe-welding device according to claim 6, including
a plurality of said cartridges and service blocks secured to said ring with each cartridge supporting a welding nozzle whereby multiple portions of the interior of abutting pipe ends may be welded at the same time.

9. An internal pipe-welding device according to claim 1, wherein said supply means includes
a service lead containing an electric conductor and adapted to deliver shielding gas to the welding nozzle.

10. An internal pipe-welding device according to claim 1, including
clamping means supported on said carriage and adapted to engage within and align abutting ends of pipes in position for welding.

11. An internal pipe-welding according to claim 10, including
alignment blocks pivotally mounted to carriage and adapted to be moved into position engaging the end of one of said pipes to position the device within the pipe, and
means for actuating said alignment blocks.

12. An internal pipe-welding device, comprising
a carriage,
clamping means supported on said carriage and adapted to engage within and align abutting ends of pipes in position for welding,
a welding nozzle and a cartridge for mounting said nozzle, said cartridge being supported on a transport means
means for rotating said transporting means and thereby carrying said welding nozzle around the interior of said abutting ends of pipes to weld said ends together,
means for supplying shielding gas and electric welding potential to said welding nozzle, and
means for releasably connecting said welding nozzle and its cartridge to said carriage,
said supply means including a switch actuated by bringing a relatively fixed contact on the transport and a movable contact on the cartridge together, said movable contact being responsive to the supply of shielding gas to connect welding potential to said welding nozzle when said shielding gas is supplied at full pressure.

13. An internal pipe-welding device, comprising
an expansible clamp for engaging within and aligning abutting ends of pipes in position for welding,
a rotating ring supported for rotation by said clamp,
means for rotating said ring with respect to the clamp,
a service block secured to said ring,
a service lead connecting to said service block,
a cartridge adapted to be releasably secured to said service block and said ring,
said cartridge including a body, welding nozzle pivotally mounted on said body, a pressure-responsive actuator connected to said nozzle, said nozzle being biased away from welding position, a supply of consumable electrode and means for feeding said electrode to said welding nozzle,
said service lead supplying shielding gas, welding current and power for said electrode feeding means to said service block,
a first contact button secured to said service block and connnected to the welding current supply of said service lead,
a second contact button secured to said pivotal with said nozzle and adapted to engage said first contact button when said nozzle is pivoted to its welding position,
means for connecting said feeding means power to said feeding means,
means for connecting said shielding gas to said pressure responsive actuator and through an orifice to said nozzle, and
beryllium copper covering means covering said service block and said cartridge and surrounding and sliding with the pivotal movement of said nozzle to protect said cartridge and said service block from welding spatter.